US010711153B2

(12) United States Patent
Zafar et al.

(10) Patent No.: US 10,711,153 B2
(45) Date of Patent: Jul. 14, 2020

(54) COMPOSITION COMPRISING LIGNIN AND EPOXY COMPOUND FOR COATING AND METHOD FOR THE MANUFACTURING THEREOF AND USE THEREOF

(71) Applicant: Stora Enso OYJ, Helsinki (FI)

(72) Inventors: Ashar Zafar, Karlstad (SE); Dimitri Areskogh, Stockholm (SE)

(73) Assignee: Stora Enso OYJ, Helsinki (FI)

( * ) Notice: Subject to any disclaimer, the term of this patent is extended or adjusted under 35 U.S.C. 154(b) by 0 days.

(21) Appl. No.: 15/024,930

(22) PCT Filed: Sep. 25, 2014

(86) PCT No.: PCT/IB2014/064833
§ 371 (c)(1),
(2) Date: Mar. 25, 2016

(87) PCT Pub. No.: WO2015/044893
PCT Pub. Date: Apr. 2, 2015

(65) Prior Publication Data
US 2016/0208134 A1 Jul. 21, 2016

(30) Foreign Application Priority Data
Sep. 27, 2013 (SE) ...................... 1351117

(51) Int. Cl.
| C09D 163/00 | (2006.01) |
| C08H 7/00 | (2011.01) |
| C09J 197/00 | (2006.01) |
| C09D 171/03 | (2006.01) |
| C09D 171/02 | (2006.01) |
| C08L 97/00 | (2006.01) |
| C08G 59/06 | (2006.01) |
| C08G 59/22 | (2006.01) |

(52) U.S. Cl.
CPC ......... *C09D 163/00* (2013.01); *C08G 59/063* (2013.01); *C08G 59/22* (2013.01); *C08H 6/00* (2013.01); *C08L 97/005* (2013.01); *C09D 171/02* (2013.01); *C09D 171/03* (2013.01); *C09J 197/005* (2013.01)

(58) Field of Classification Search
CPC ................. C07G 1/00; C08L 63/00–10; C08L 97/00–02; C09D 163/00–10; C09D 197/00–02; C09J 163/00–10; C09J 197/00–02; C08H 6/00
See application file for complete search history.

(56) References Cited

U.S. PATENT DOCUMENTS

| 3,649,589 | A | * | 3/1972 | Mayfield | ................. C08L 63/00 523/450 |
| 3,726,850 | A | * | 4/1973 | John | ........................ C08H 6/00 106/823 |
| 5,063,089 | A | | 11/1991 | Lindert et al. | |
| 5,104,604 | A | * | 4/1992 | Gallo | ..................... C08G 59/30 257/E23.119 |
| 5,833,883 | A | | 11/1998 | Afzali-Ardakani et al. | |
| 2002/0061941 | A1 | * | 5/2002 | Masamune | ........ C08G 59/3218 523/404 |
| 2010/0155122 | A1 | | 6/2010 | Okabe et al. | |
| 2011/0213057 | A1 | | 9/2011 | Fenn et al. | |
| 2012/0014870 | A1 | | 1/2012 | Aburatani et al. | |
| 2012/0148740 | A1 | | 6/2012 | Yang et al. | |
| 2015/0135992 | A1 | * | 5/2015 | Kobune | ............... C08G 59/621 106/287.2 |
| 2015/0344737 | A1 | * | 12/2015 | Bode | ....................... C08H 6/00 428/35.7 |

FOREIGN PATENT DOCUMENTS

| DE | 20202181 U1 | 5/2002 | |
| JP | 361215678 | 9/1986 | |
| JP | 2009263549 | 11/2009 | |
| JP | 2011099083 | 5/2011 | |
| JP | 2011099083 A | 5/2011 | |
| WO | 2006067229 A1 | 6/2006 | |
| WO | 2011099544 A1 | 2/2011 | |
| WO | WO-2011099544 A1 * | 8/2011 | ........... C08G 59/621 |
| WO | 2013050661 A1 | 4/2013 | |

OTHER PUBLICATIONS

Nonaka et al., "Synthesis of Lignin/Epoxy Resins in Aqueous Systems and Their Properties," Holzforschung 51, 183-187 (Year: 1997).*
Leon Shechter et al., "Glycidyl Ether Reactions With Alcohols, Phenols, Carboxylic Acids, and Acid Anhydrides," Industrial and Engineering Chemistry, vol. 48, No. 1, pp. 86-93, dated Jan. 1956.
Hasan Sadeghifar, et al., "Toward Thermoplastic Lignin Polymers. Part 1. Selective Masking of Phenolic Hydroxyl Groups in Kraft Lignins via Methylation and Oxypropylation Chemistries," I&EC Research Article, ACS Publications, 2012 American Chemical Society, pp. 16713-16720, published Dec. 4, 2012.
Theodor Malutan et al., "Lignin Modification by Epoxidation," Peer-Reviewed Article in bioresources.com, 2008, pp. 1371-1376.
The extended European Search Report for corresponding EP application No. EP14849103, dated Apr. 5, 2017.
Ozone Oxidizing Degradation of Alkai Wheat Straw Lignin and Application of the Modified Lignin, Wang et al., ., Transactions of China Pulp and Paper, vol. 20, No. 1, pp. 101-105, 2005.
Soda Lignin Hydroxymethylation, Wenjun et al. Journal of Northeast Forestry University, vol. 41, No. 6, pp. 130-134, Jun. 2013.

(Continued)

*Primary Examiner* — Kregg T Brooks
(74) *Attorney, Agent, or Firm* — Greer, Burns & Crain Ltd.

(57) ABSTRACT

The present invention relates to a composition for coating, in particular a composition comprising lignin and one or more epoxy-group containing compounds, and methods for the manufacturing thereof and uses thereof. The present invention also relates to products obtainable by said methods and uses thereof.

7 Claims, No Drawings

(56) References Cited

OTHER PUBLICATIONS

Nonaka, Y, et al., Synthesis of lignin/epoxy resins in aqueous systems and their properties, Holzforschung, 51(2), pp. 183-187, 1997.
Hu, Lihong, et al., Methods to Improve Lignin's Reactivity as a Phenol Substitute and as Replacement for Other Phenolic Compounds: a Brief Review, BioResources 6(3), 3515-3525, 2011.
Khalil, Abdul,et al., Material Properties of Epoxy-Reinforced Biocomposites with Lignin from Empty Fruit Bunch as Curing Agent, BioResources 6(4), 5206-5223, 2011.
Hofmann, Klaus, et al., Engineering plastics from lignin, 23t. Network formation of lignin-based epoxy resins, Macromolecular Chemistry and Physics, vol. 195, Issue 1, Jan. 1994.
Delmas, Guo-Hua, et al., Biolignin Based epoxy resins, Journal of Applied Polymer Science, vol. 127, Issue 3, May 2012.
Feldman, D., et al., Epoxy-lignin polyblends: Correlation between polymer interaction and curing temperature, Journal of Applied Polymer Science, vol. 42, Issue 5, Mar. 1991.

* cited by examiner

COMPOSITION COMPRISING LIGNIN AND EPOXY COMPOUND FOR COATING AND METHOD FOR THE MANUFACTURING THEREOF AND USE THEREOF

This application is a U.S. National Phase under 35 U.S.C. § 371 of International Application No. PCT/IB2014/064833, filed Sep. 25, 2014, which claims priority under 35 U.S.C. §§ 119 and 365 to Swedish Patent Application No. 1351117-5, filed Sep. 27, 2013.

FIELD OF INVENTION

The present invention relates to a composition for coating and methods for the manufacturing thereof and uses thereof. The present invention also relates to products obtainable by said methods and uses thereof.

BACKGROUND

Lignin, a by-product from the pulp and paper industry is a potentially important chemical to be used in polymer composites. One significant area is epoxy resin and epoxy resin composites for metal coatings.

Metal food and beverage cans have a protective coating on the interior surface, which is essential to prevent the content from coming into contact with the metal surfaces of the containers. Contact of the canned food with the metal surface can lead to corrosion of the metal container and results into contamination and spoiling of food content. In addition, these coatings protect food products from the metal surface to prevent degradation of taste, texture and color.

The most common and important class of epoxy resins utilizes the reaction between Bisphenol-A (BPA) and epichlorohydrin. While it has been demonstrated that epichlorohydrin can be produced from glycerol, a renewable by-product, replacing non-renewable BPA to formulate a completely renewable epoxy resin remains a challenge.

There are major concerns on using epoxy based can coatings based on Bisphenol A (BPA), which is endocrine disrupter. The 2003-2004 National Health and Nutrition Examination Survey (NHANES III) conducted by the Centers for Disease Control and Prevention (CDC) revealed widespread human exposure to BPA from canned food products. It was discovered that there were detectable levels of BPA in 93% of 2517 urine samples from people six years and older. BPA based epoxy coatings for infants and small children food products have been banned by some countries including Denmark, France, Belgium and Sweden.

There is also increasing pressure on coating formulators to phase out BPA based coatings for food contact applications. Currently, the food packaging industry and consumer groups are developing non-BPA interior coatings or have established timetables for replacement of more acceptable substitutes. Owing to the low to-none toxicological effects, great availability and renewability, lignin, with its' aromatic backbone and reactive hydroxyl groups could be a potential substitute for BPA. Taking full advantage of the structural and chemical properties of lignin, it is expected that lignin-based resins can display similar properties to those based on non-renewable petrochemical precursors. Over the years a great number of reports have demonstrated the feasibility of incorporating lignin into epoxy resin formulations. Several approaches have been demonstrated, direct utilization of lignin (J. Appl. Polym. Sci. 42(5), 103-1318, (1991); Holzforschung 51(2), 183-187 (1997); J. Appl. Polym. Sci. 127(3), 1863-1872 (2013)), modification of lignin prior to epoxy resin formulation (Macromol. Chem. Phys. 195(1), 65-80 (1994); Bioresources 6(3), 3515-3525 (2011); Pat. No. US2012148740A1; Pat. No. WO2013050661) and utilization of lignin as a curing agent (Bioresources, 6(4), 5206-5223, (2011) or as a cross-linking agent (U.S. Pat. No. 5,833,883).

Further, U.S. Pat. No. 5,063,089 discloses a metal treatment solution comprising an effective amount of a soluble or dispersible compound which is a derivative of a polyphenol.

Further, DE20202181U1 discloses a vessel for liquid substances which is made from thermoplastic material containing lignin.

In addition, WO2006067229 discloses a vessel, in particular an urn made from a biodegrable material, wherein said material is a starch-free injection moldable material which essentially contains wood fibers and natural fibers and wood powder and binding agents, preferably lignin.

Accordingly there is a need for a solution solving one or more of the above problems.

SUMMARY OF THE INVENTION

The present invention solves one or more of the above problems, by providing according to a first aspect a composition for coating, comprising lignin and one or more epoxy-group containing compounds.

The present invention also provides according to a second aspect use of a composition according to the first aspect as metal coating formulation, preferably for use in containers, most preferred for use in cans.

The present invention also provides according to a third aspect a method for manufacturing a composition for coating, according to the first aspect, comprising the following steps:
 i) providing a lignin or a modified lignin,
 ii) adding a solvent,
 iii) adding an epoxy-group containing compound,
 iv) mixing and heating said components,
 v) adding a catalyst and
 vi) mixing the lignin, epoxy compound, solvent and catalyst, thus providing a composition.

The present invention also provides according to a fourth aspect a method for manufacturing a composition for coating, according the first aspect, comprising the following steps:
 x) providing a lignin or a modified lignin,
 y) adding a solvent,
 z) adding an epoxy-group containing compound and mixing said components, thus providing a composition.

The present invention also provides according to a fifth aspect a composition obtainable by the method according to the third or fourth aspect.

The present invention also provides according to a sixth aspect use of a composition according to the fifth aspect for metal coating formulations and preparations, preferably for use in coating containers, most preferred in cans.

The present invention also provides according to a seventh aspect use of a composition according to the first aspect or fifth aspect in coating applications, preferably for metal coating, preferably for use in coating containers, most preferred for coating cans.

DETAILED DESCRIPTION OF THE INVENTION

It is intended throughout the present description that the expression "epoxy-group containing compound" embraces any compound carrying an epoxy-moiety.

It is intended throughout the present description that the expression "catalyst" embraces any type of compound that acts as a base, and it could be of both organic type or of aqueous type.

It is intended throughout the present description that the expression "solvent" embraces any compound that may dissolve lignin.

According to a preferred embodiment of the first aspect of the invention the composition comprises lignin, a catalyst and an epoxy-group containing compound.

According to a preferred embodiment of the first aspect of the invention said composition also comprises one or more solvents.

According to a preferred embodiment of the first aspect of the invention the solvent is an organic or aqueous solvent or combinations thereof, preferably said solvent is selected from the group consisting DMSO, NaOH, MeOH, DMF, water and combinations thereof.

According to a preferred embodiment of the first aspect of the invention the catalyst is a base, preferably said catalyst is selected from group consisting of Triethylenetriamine (TETA), Tetramethylammonium hydroxide (TMAH), triethylamine (TEA) and combinations thereof.

According to a preferred embodiment of the first aspect of the invention the epoxy-group containing compound is selected from the group consisting of epichlorohydrin (ECH), poly(ethylene glycol) diglycidyl ether (PEGDGE), bisphenol A-epichlorohydrin and combinations thereof.

According to a preferred embodiment of the first aspect of the invention the lignin is a modified lignin which preferably has been modified through alkoxylation, ozonolysis, phenolation or hydroxymethylation.

According to a preferred embodiment of the third aspect of the invention the solvent of step b) also comprises a catalyst. The mixing during step iii) and v) may be performed during 0.1 to 24 hours. Further the temperature range during step iii) is from room temperature to 100° C., preferably about 70° C.

According to a preferred embodiment of the third aspect of the invention the method is preceded by the following steps:
a) providing a lignin or a modified lignin,
b) adding a solvent,
c) heating the mixture and adding an oxide,
d) adjusting the pH and optionally
e) filtering, washing and freeze-drying the oxide-modified lignin obtained.

According to a preferred embodiment of the third aspect of the invention the method is preceded by the following steps:
A1) providing a lignin or a modified lignin,
B1) adding a solvent,
C1) heating the mixture and adding formaldehyde,
D1) adjusting the pH and optionally
E1) filtering, washing and freeze-drying the hydroxymethylated lignin obtained.

According to a preferred embodiment of the third aspect of the invention the method is preceded by the following steps:
A2) providing a lignin or a modified lignin,
B2) adding a solvent,
C2) heating the mixture and treat it with ozone,
D2) adjusting the pH and optionally
E2) filtering, washing and freeze-drying the ozonolyzed lignin obtained.

According to a preferred embodiment of the third aspect of the invention the method is preceded by the following steps:
A3) providing a lignin or a modified lignin,
B3) adding phenol and concentrated sulphuric acid
C3) heating the mixture
D3) adjusting the pH and optionally
E3) filtering, washing and freeze-drying the phenolated lignin obtained.

The lignin-based epoxy resins for coating applications disclosed in this text are prepared in three ways; direct epoxidation of lignin, modification of lignin prior to epoxidation and direct blending of lignin in epoxy resins as set out in the different aspects and embodiments of the present invention.

A further way to describe the different aspects and embodiments of the present invention is that the composition according to the first aspect comprises an epoxy resin made by mixing 10-20 parts by weight of lignin with 10-20 parts by weight of catalyst in 80-90 parts by weight of a solvent (aqueous or organic) to form a mixture. To the mixture, 150 to 5 parts by weight of an epoxide compound is added to form an epoxy resin solution which is applied on a suitable substrate to produce a lignin based epoxy resin coating.

The lignin may, as mentioned earlier, be added directly or be modified before addition to improve its' reactivity. There are several approaches to modify, and thus improve the reactivity of lignin, e.g. ozonolysis to generate reactive carbonyl compounds, phenolation to introduce reactive phenolic structures to the lignin backbone, hydroxymethylation where reactive hydroxymethyl groups are introduced to the lignin structure and alkoxylation where the phenolic hydroxyls in lignin are converted to aliphatic hydroxyls.

The lignin may thus be added as blending agent in epoxy resin formulations to significantly reduce the amount of BPA. The final lignin-epoxy resin blend comprises of up to 40-90 parts of lignin and 10-60 parts of a bisphenol-A diglycidyl ether epoxy resin.

Preferred features of each aspect of the invention are as for each of the other aspects mutatis mutandis. The prior art documents mentioned herein are incorporated to the fullest extent permitted by law. The invention is further described in the following examples, which do not limit the scope of the invention in any way. Embodiments of the present invention are described as mentioned in more detail with the aid of examples of embodiments the only purpose of which is to illustrate the invention and are in no way intended to limit its extent.

EXAMPLES

Example 1

Coating Preparation of Lignin With Epichlorohydrin (1/5 w/w) in DMSO 1 g of lignin was dissolved in 5 ml of dimethyl sulfide (DMSO). Subsequently, 5 g of epichlorohydrin (ECH) was added to the solution for a heating reaction at 70° C. for 14 hours in a closed glass tube. Then, 0.2 g of Triethylenetriamine (TETA) was added to the mixture and mixed for 20 minutes. The mixture was uniformly coated by a spray gun on an aluminum foil (thickness 0.2 mm). The coating was cured at 200° C. for 60 minutes.

The solidified coating showed smooth and bright appearance, good flexibility, an adhesiveness of 100/100 by scotch tape test, a pencil hardness of 3H and rub resistance against DMF, DMSO, Methanol and alkaline (pH=12) and acidic (pH=2) water solutions.

Example 2

Coating Preparation of Lignin With Epichlorohydrin (1/10 w/w) in DMSO 1 g of lignin was dissolved in 5 ml of dimethyl sulfide (DMSO). Subsequently, 10 g of epichlorohydrin (ECH) was added to the solution for a heating reaction at 70° C. for 14 hours in a closed glass tube. Then, 0.2 g of Triethylenetriamine (TETA) was added to the mixture and mixed for 20 minutes. The mixture was uniformly coated by a spray gun on an aluminum foil (thickness 0.2 mm). The coating was cured at 200° C. for 60 minutes.

The solidified coating showed smooth and bright appearance, good flexibility, an adhesiveness of 100/100 by scotch tape test, a pencil hardness of 3H and rub resistance against DMF, DMSO, Methanol and alkaline (pH=12) and acidic (pH=2) water solutions.

Example 3

Coating Preparation of Lignin With Epichlorohydrin (1/15 w/w) in DMSO 1 g of lignin was dissolved in 5 ml of dimethyl sulfide (DMSO). Subsequently, 15 g of epichlorohydrin (ECH) was added to the solution for a heating reaction at 70° C. for 14 hours in a closed glass tube. Then, 0.2 g of Triethylenetriamine (TETA) was added to the mixture and mixed for 20 minutes. The mixture was uniformly coated by a spray gun on an aluminum foil (thickness 0.2 mm). The coating was cured at 200° C. for 60 minutes.

The solidified coating showed smooth and bright appearance, good flexibility, an adhesiveness of 100/100 by scotch tape test, a pencil hardness of 3H and rub resistance against DMF, DMSO, Methanol and alkaline (pH=12) and acidic (pH=2) water solutions.

Example 4

Coating Preparation of Lignin With Epichlorohydrin in DMF 1 g of lignin was dissolved in 5 ml of dimethylformamide (DMF). Subsequently, 10 g of epichlorohydrin (ECH) was added to the solution for a heating reaction at 70° C. for 14 hours in a closed glass tube. Then, 0.2 g of Triethylenetriamine (TETA) was added to the mixture and mixed for 20 minutes. The mixture was uniformly coated by a spray gun on an aluminum foil. The coating was cured at 200° C. for 60 minutes The solidified coating showed smooth and bright appearance, good flexibility, an adhesiveness of 100/100 by scotch tape test, a pencil hardness of 3H and rub resistance against DMF, DMSO, Methanol and alkaline (pH=12) and acidic (pH=2) water solutions.

Example 5

Coating Preparation of Lignin With Poly(Ethylene Glycol) Diglycidyl Ether in DMF 1 g of lignin was dissolved in 5 ml of dimethylformamide (DMF). Subsequently, 1 g of poly(ethylene glycol) diglycidyl ether (PEGDGE) was added to the solution for a heating reaction at 70° C. for 14 hours in a closed glass tube. Then, 0.2 g of Triethylenetriamine (TETA) was added to the mixture and mixed for 20 minutes. The mixture was uniformly coated by a spray gun on an aluminum foil. The coating was cured at 200° C. for 60 minutes The solidified coating showed smooth and bright appearance, good flexibility, an adhesiveness of 100/100 by scotch tape test, a pencil hardness of 3H and rub resistance against DMF, DMSO, Methanol and alkaline (pH=12) and acidic (pH=2) water solutions.

Example 6

Coating Preparation of Lignin With Poly(Ethylene Glycol) Diglycidyl Ether in DMSO 1 g of lignin was dissolved in 5 ml of dimethyl sulfoxide (DMSO). Subsequently, 1 g of poly(ethylene glycol) diglycidyl ether (PEGDGE) was added to the solution for a heating reaction at 70° C. for 14 hours in a closed glass tube. Then, 0.2 g of Triethylenetriamine (TETA) was added to the mixture and mixed for 20 minutes. The mixture was uniformly coated by a spray gun on an aluminum foil. The coating was cured at 200° C. for 60 minutes The solidified coating showed smooth and bright appearance, good flexibility, an adhesiveness of 100/100 by scotch tape test, a pencil hardness of 3H and rub resistance against DMF, DMSO, Methanol and alkaline (pH=12) and acidic (pH=2) water solutions.

Example 7

Coating Preparation of Lignin, Epichlorohydrin in Methanol and Tetramethylammonium Hydroxide As Catalyst 1 g of lignin was dissolved in 5 ml of 25% Tetramethylammonium hydroxide (TMAH) as catalyst in methanol. Subsequently, 10 g of epichlorohydrin was added to the solution for a heating reaction at 70° C. for 3 hours in a closed glass tube. Then, 0.2 g of Triethylenetriamine (TETA) was added to the mixture and mixed for 20 minutes. The mixture was uniformly coated by a spray gun on an aluminum foil. The coating was cured at 200° C. for 60 minutes.

The solidified coating showed smooth and bright appearance, good flexibility, an adhesiveness of 100/100 by scotch tape test, a pencil hardness of H and rub resistance against DMF, DMSO, Methanol and water. High stability to acidic medium was demonstrated after submersion in a diluted HCl-water mixture with pH 2 for 18 h.

Example 8

Coating Preparation of Lignin, Epichlorohydrin in Methanol/Water and Tetramethylammonium Hydroxide As Catalyst 1 g of lignin was dissolved in 2.5 ml of 25% Tetramethylammonium hydroxide (TMAH) as catalyst 1 in a 50% methanol-water mixture (v/v). Subsequently, 10 g of epichlorohydrin was added to the solution for a heating reaction at 70° C. for 3 hours in a closed glass tube. Surprisingly, it was found that no precipitates were formed during the reaction between lignin and epichlorohydrin in methanol-water mixtures when using TMAH as a catalyst.

Absence of TMAH as catalyst yields precipitation when mixing lignin and epichlorohydrin in methanol-water. Finally, 0.2 g of Triethylenetriamine (TETA) was added to the mixture and mixed for 20 minutes. The mixture was uniformly coated by a spray gun on an aluminum foil. The coating was cured at 200° C. for 60 minutes.

The solidified coating showed smooth and bright appearance, good flexibility, an adhesiveness of 100/100 by scotch tape test, a pencil hardness of 2H and rub resistance against DMF, DMSO, Methanol and water. High stability to acidic medium was demonstrated after submersion in a diluted HCl-water mixture with pH 2 for 18 h.

Example 9

Coating Preparation of Lignin and Epichlorohydrin in Methanol/Water and Tetramethylammonium Hydroxide As Catalyst 1 g of lignin was dissolved in 1 ml of 25% Tetramethylammonium hydroxide (TMAH) as catalyst in a 50% methanol-water mixture (v/v). Subsequently, 10 g of epichlorohydrin was added to the solution for a heating reaction at 70° C. for 3 hours in a closed glass tube. Surprisingly, it was found that no precipitates were formed during the reaction between lignin and epichlorohydrin in methanol-water mixtures when using TMAH as a catalyst. Absence of TMAH as catalyst yields precipitation when mixing lignin and epichlorohydrin in methanol-water. Finally, 0.2 g of Triethylenetriamine (TETA) was added to the mixture and mixed for 20 minutes. The mixture was uniformly coated by a spray gun on an aluminum foil. The coating was cured at 200° C. for 60 minutes.

The solidified coating showed smooth and bright appearance, good flexibility, an adhesiveness of 100/100 by scotch tape test, a pencil hardness of 2H and rub resistance against DMF, DMSO, Methanol and water. High stability to acidic medium was demonstrated after submersion in a diluted HCl-water mixture with pH 2 for 18 h.

Example 11

Coating Preparation of Lignin and Epichlorohydrin in Methanol/Water and Triethylamine As Catalyst 1 g of lignin was dissolved in 0.5 ml of 25% triethylamine (TEA) as catalyst in a 50% methanol-water mixture (v/v). Subsequently, 10 g of epichlorohydrin was added to the solution for a heating reaction at 70° C. for 3 hours in a closed glass tube. Surprisingly, it was found that no precipitates were formed during the reaction between lignin and epichlorohydrin in methanol-water mixtures when using TEA as a catalyst. Absence of TMAH as catalyst yields precipitation when mixing lignin and epichlorohydrin in methanol-water. Finally, 0.2 g of Triethylenetriamine (TETA) was added to the mixture and mixed for 20 minutes. The mixture was uniformly coated by a spray gun on an aluminum foil. The coating was cured at 200° C. for 60 minutes.

The solidified coating showed smooth and bright appearance, good flexibility, an adhesiveness of 100/100 by scotch tape test, a pencil hardness of 3H and rub resistance against DMF, DMSO, Methanol and water. High stability to acidic medium was demonstrated after submersion in a diluted HCl-water mixture with pH 2 for 18 h.

Example 11

Alkoxylation of Lignin 2 g of lignin was dissolved in 5 ml 0.5M NaOH. The dissolved lignin was heated to 40° C. To the heated mixture, 1.4 g of propylene oxide was added drop wise. The reaction took place for 18 h after which the pH was lowered to pH 2 with hydrochloric acid or sulfuric acid. The alkoxylated lignin was filtered, washed with deionized $H_2O$ and freeze-dried. Conversion rate of phenolic hydroxylic groups to aliphatic hydroxylic groups was calculated to 99% with phosphorous-31P-NMR as described elsewhere (J. Wood Chem. Technol. 14, 45-63 (1994)).

Example 12

Coating Preparation of Alkoxylated Lignin With Epichlorohydrin in DMF 1 g of alkoxylated lignin from Example 12 was dissolved in 5 ml of dimethylformamide (DMF). Subsequently, 10 g of epichlorohydrin was added to the solution for a heating reaction at 70° C. for 3 hours in a closed glass tube. Then, 0.2 g of Triethylenetriamine (TETA) was added to the mixture and mixed for 20 minutes. The mixture was uniformly coated by a spray gun on an aluminum foil. The coating was cured at 200° C. for 60 minutes The solidified coating showed smooth and bright appearance, good flexibility, an adhesiveness of 100/100 by scotch tape test, a pencil hardness of 3H and rub resistance against DMF, DMSO, Methanol and water.

Example 13

Coating Preparation of Alkoxylated Lignin and Epichlorohydrin in Methanol/Water and Tetramethylammonium Hydroxide as Catalyst 1 g of lignin was dissolved in 1 ml of 25% Tetramethylammonium hydroxide (TMAH) as catalyst in a 50% methanol-water mixture (v/v). Subsequently, 10 g of epichlorohydrin was added to the solution for a heating reaction at 70° C. for 3 hours in a closed glass tube. Surprisingly, it was found that no precipitates were formed during the reaction between alkoxylated lignin and epichlorohydrin in methanol-water mixtures when using TMAH as a catalyst. Absence of TMAH as catalyst yields precipitation when mixing lignin and epichlorohydrin in methanol-water. Finally, 0.2 g of Triethylenetriamine (TETA) was added to the mixture and mixed for 20 minutes. The mixture was uniformly coated by a spray gun on an aluminum foil. The coating was cured at 200° C. for 60 minutes.

The solidified coating showed smooth and bright appearance, good flexibility, an adhesiveness of 100/100 by scotch tape test, a pencil hardness of 2H and rub resistance against DMF, DMSO, Methanol and water. High stability to acidic medium was demonstrated after submersion in a diluted HCl-water mixture with pH 2 for 18 h.

Example 14

Coating Preparation of Alkoxylated Lignin Epichlorohydrin in Methanol/Water and Trimethylamine As Catalyst 1 g of alkoxylated lignin from Example 12 was dissolved in 0.5 ml of Trimethylamine (TEA) as catalyst in a 1:1 methanol/water mixture (v/v). Subsequently, 10 g of epichlorohydrin was added to the solution for a heating reaction at 70° C. for 3 hours in a closed glass tube. Surprisingly, it was found that no precipitates were formed during the reaction between alkoxylated lignin and epichlorohydrin in methanol-water mixtures when using TEA as a catalyst. Absence of TMAH as catalyst yields precipitation when mixing lignin and epichlorohydrin in methanol-water. Finally, 0.2 g of Triethylenetriamine (TETA) was added to the mixture and mixed for 20 minutes. The mixture was uniformly coated by a spray gun on an aluminum foil. The coating was cured at 200° C. for 60 minutes.

The solidified coating showed smooth and bright appearance, good flexibility, an adhesiveness of 100/100 by scotch tape test, a pencil hardness of 3H and rub resistance against DMF, DMSO, Methanol and water.

Example 15

Coating Preparation by Blending Lignin With Epoxy Resin 1 g of lignin was dissolved in 5 ml of 20% sodium hydroxide solution. Subsequently, 0.55 g of epoxy resin (bisphenol A-epichlorohydrin) was added to the solution and mixed for 20-30 minutes at room temperature. The solid content of epoxy resin was 60%, so the total dry weight of the epoxy resin was 0.25 g. The mixture was uniformly coated by a spray gun on an aluminum foil. The coating was cured at 200° C. for 60 minutes.

The solidified coating showed smooth and bright appearance, good flexibility, an adhesiveness of 90/100 by scotch tape test, a pencil hardness of H and rub resistance against DMF, DMSO, Methanol and water.

Example 16

Coating Preparation by Blending Lignin With Epoxy Resin 1 g of lignin was dissolved in 5 ml of 20% sodium hydroxide solution. Subsequently, 1.7 g of epoxy resin (bisphenol A-epichlorohydrin) was added to the solution and mixed for 20-30 minutes at room temperature. The solid content of epoxy resin was 60%, so the total dry weight of the epoxy resin was 1 g. The mixture was uniformly coated by a spray gun on an aluminum foil. The coating was cured at 200° C. for 60 minutes.

The solidified coating showed smooth and bright appearance, good flexibility, an adhesiveness of 90/100 by scotch tape test, a pencil hardness of 2H and rub resistance against DMF, DMSO, Methanol and water.

Various embodiments of the present invention have been described above but a person skilled in the art realizes further minor alterations, which would fall into the scope of the present invention. The breadth and scope of the present invention should not be limited by any of the above-described exemplary embodiments, but should be defined only in accordance with the following claims and their equivalents. For example, any of the above-noted methods or compositions may be combined with other known methods or compositions. Other aspects, advantages and modifications within the scope of the invention will be apparent to those skilled in the art to which the invention pertains.

The invention claimed is:

1. A composition for coating, comprising unmodified lignin or modified lignin or both, a triethylenetriamine (TETA) catalyst, one or more epoxy-group containing compounds selected from the group consisting of epichlorohydrin (ECH), and poly(ethylene glycol) diglycidyl ether (PEGDGE), and combinations thereof, and a solvent selected from the group consisting of DMSO, MeOH, MeOH and water and combinations thereof, wherein the unmodified lignin is lignin that has not been modified through alkoxylation, ozonolysis, phenolation, or hydroxymethylation, and wherein the modified lignin is lignin that has been modified through alkoxylation, ozonolysis, or hydroxymethylation.

2. The composition of claim 1 wherein the composition is BPA-free.

3. A method for manufacturing a composition for coating, comprising the following steps:
   i) providing an unmodified lignin or a modified lignin, wherein the unmodified lignin is lignin that has not been modified through alkoxylation, ozonolysis, phenolation, or hydroxymethylation, and wherein the modified lignin is an oxide-modified lignin, a hydroxymethylated modified lignin, or an ozonized-modified lignin,
   ii) adding a solvent selected from the group consisting of DMSO, MeOH, MeOH and water, and combinations thereof,
   iii) adding an epoxy-group containing compound selected from the group consisting of epichlorohydrin (ECH), and poly(ethylene glycol) diglycidyl ether (PEGDGE), and combinations thereof,
   iv) mixing and heating to form a heated mixture,
   v) adding a triethylenetriamine (TETA) catalyst thereof to the heated mixture, and
   vi) mixing the heated mixture and catalyst, thus providing a composition.

4. A method according to claim 3 wherein the modified lignin is the oxide-modified lignin formed by:
   a) providing a lignin,
   b) adding a solvent,
   c) heating the mixture and adding an oxide,
   d) adjusting the pH and optionally
   e) filtering, washing and freeze-drying the oxide-modified lignin obtained.

5. A method according to claim 3 wherein the modified lignin is the hydroxymethylated modified lignin formed by:
   A1) providing a first lignin,
   B1) adding a solvent,
   C1) heating the mixture and adding formaldehyde,
   D1) adjusting the pH and optionally
   E1) filtering, washing and freeze-drying the hydroxymethylated modified lignin obtained.

6. A method according to claim 3 wherein the modified lignin is the ozonized-modified lignin formed by:
   A2) providing a first lignin,
   B2) adding a solvent,
   C2) heating the mixture and treat it with ozone,
   D2) adjusting the pH and optionally
   E2) filtering, washing and freeze-drying the ozonized-modified lignin obtained.

7. A composition obtainable by the method according to claim 3.

* * * * *